United States Patent Office 3,272,685
Patented Sept. 13, 1966

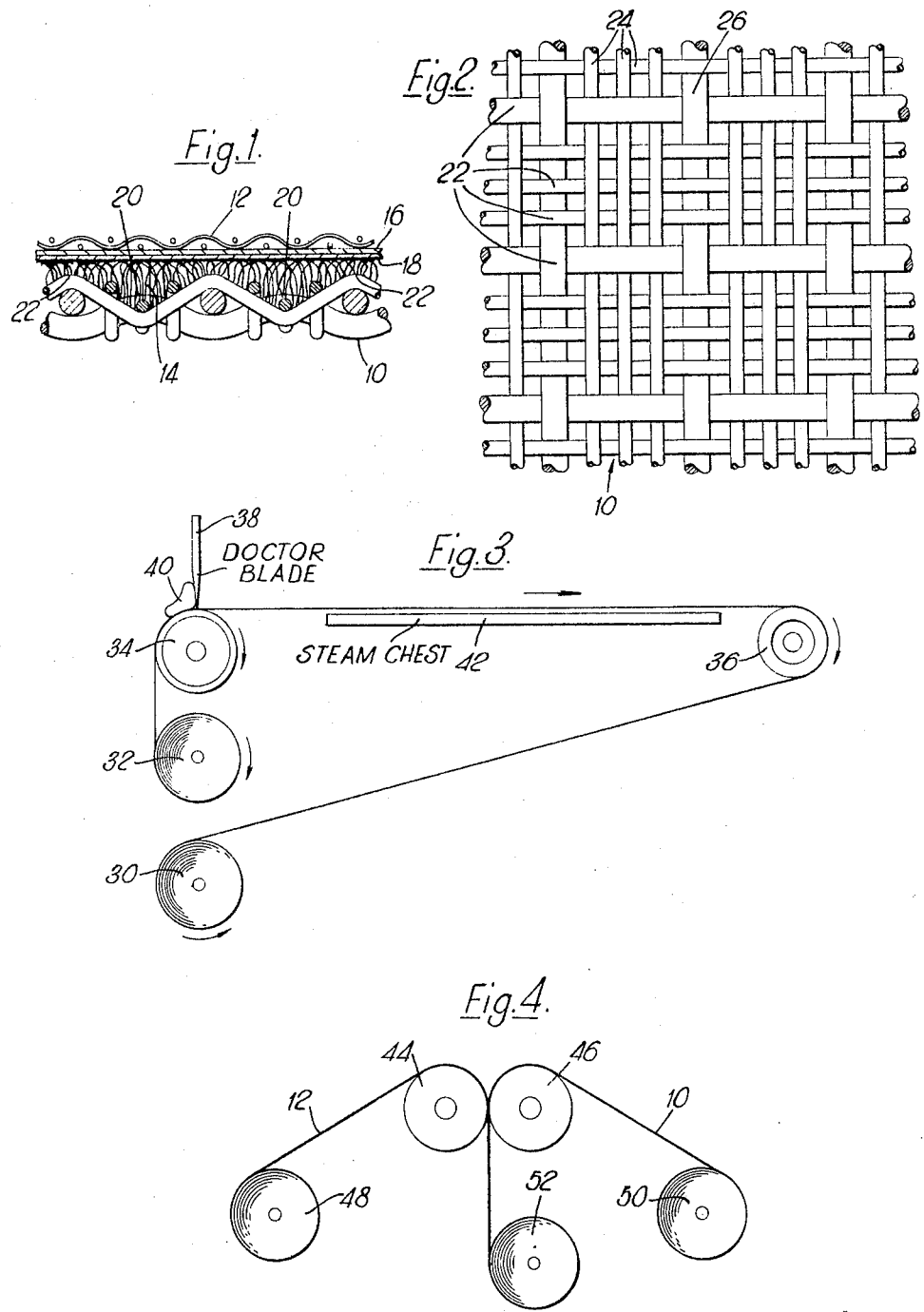

3,272,685
WOVEN WATERPROOF FABRICS
Joseph Kagan, 6 Wharncliffe Grove,
Frizinghall, Bradford, England
Filed May 5, 1964, Ser. No. 365,003
14 Claims. (Cl. 161—49)

This invention relates to woven fabrics and is particularly concerned with a composite fabric which is both warm and waterproof. This application is a continuation-in-part of copending application Serial No. 825,002, filed July 6, 1959, now abandoned, which in turn is a continuation-in-part of application Serial No. 489,688, filed February 21, 1955, now abandoned.

One object of the invention is to provide a woven fabric which is both warm and waterproof so that it is ideal for outer garments such as raincoats.

Another object of the invention is to provide a composite fabric having two plies which are so joined together that moisture between the plies can dry very quickly.

Yet another object of the invention is to provide a simple method of bonding together two plies to form a composite fabric.

These and further objects of the invention will become apparent from the following description of woven fabrics and their manufacture in accordance with the invention, the fabrics and the method of making them being illustrated by way of example in the accompany drawings, in which:

FIGURE 1 is a section through a small portion of one form of woven fabric in accordance with the invention;

FIGURE 2 is a plan view of a ply forming part of the fabric shown in FIGURE 1;

FIGURE 3 is a diagrammatic view of apparatus for applying an adhesive to the plies of the woven fabric during manufacture; and FIGURE 4 is a diagrammatic view of apparatus for bringing together two plies of the woven fabric after adhesive has been applied to the plies by the apparatus shown in FIGURE 3.

The woven fabric shown in FIGURE 1 is a composite fabric comprising two plies 10 and 12. The upper ply 12 is a waterproof or waterproofed woven fabric, while the lower ply 10 is formed of a knitted or woven wool or part-wool yarn of low twist having a multiplicity of raised fibres 14. The two plies are bonded together by an adhesive coating 16 on the lower surface of the upper ply 12 and by a compatible adhesive 18 which is attached to the tips of the raised fibres 14 but not to their roots. The two adhesives extend over the entire opposed surfaces of the two plies 10 and 12.

It will therefore be seen that the woven fabric comprises essentially a first ply 10 of woven or knitted fabric of wool, or of wool and non-wool yarns, and a second ply 12 of woven fabric of natural yarn, artificial yarn or a blend of such yarns, the two plies being bonded together in such a way as to produce intercommunicating air channels or cells 20 between the plies. It is found that these channels or cells 20 increase the heat-insulating capacity of the fabric. Further, because the cells intercommunicate with each other, vapour is disseminated throughout them and does not therefore become concentrated in small zones. This assists the fabric in drying quickly. In order to provide these vapour-disseminating and quick-drying properties in the composite fabric, the wool or part-wool yarn of the ply 10 includes a multiplicity of raised fibres 14 and is of very low twist. Attachment between the plies 10 and 12 therefore takes place at the raised fibres 14 with the result that the fabric has a high degree of flexibility and softness. These advantages are enhanced by the use of a first ply 10 of open weave or knitting and by ensuring that the yarn is loosely set.

Several different methods can be used to produce the ply 10. One method consists in weaving the ply with warp threads of different thickness and/or with weft threads of different thickness so that the ply 10 has a number of high points 22 throughout its surface. This ensures that intercommunicating air channels or cells 20 are formed when the ply 10 is bonded to the ply 12. If desired, the threads may be in groups of different thickness in order to produce the high points 22.

Another method of producing the high points 22 on the ply 10 resides in adopting a hopsack weave or, alternatively, in spacing the warp yarn and/or the weft yarn unequally, for example by excluding yarn at intervals. Any such weave which gives a preponderance of warp on one face and a preponderance of weft on the other may be employed for weaving the ply 10.

A somewhat different method of producing the cells or channels 20 consists in making the composite fabric of a ply 12 having a greater coefficient of shrinkage than the ply 10 and in shrinking the plies by means of heat and water after they have been bonded together so that hills and valleys are produced in the ply 10. The valleys in the ply 10 then serve as intercommunicating channels or cells 20. Shrinkage of the plies can be controlled by providing the warp and/or weft threads of one of the plies with different degrees of twist so that the threads contract to different extents when shrunk, thereby producing the hills and valleys mentioned above.

The ply 12 will generally be precoated with a waterproof layer of rubber or the like before the bonding operation, but in some cases the bonding or adhesive material alone will impart the waterproof quality to the second ply 12.

In the preferred form of the invention, the ply 10 consists of a woven or knitted fabric having comparatively great bulk in relation to weight. The wool or part-wool yarn from which the ply is woven is of low twist, the yarns are loosely set, and the weave is such that a number of high points 22 are produced in the woven fabric. Because there are high points it follows that there are depressions or valleys between the high points, and these depressions form the channels or cells 20. The yarn includes raised fibres 14 which are bonded to the second ply 12 in such a way that the high points on the first ply 10 lie nearest to but are not bodily stuck to the second ply 12. They are "anchored" to the second ply 12 by reason of the fact that the raised fibres 14 projecting from the first ply 10 are bonded at their tips to the second ply 12.

The particular ply 10 shown in FIGURE 1 has weft yarns of two different thicknesses and warp yarns of two different thicknesses, the thinner yarns 24 being in groups of three and the thicker yarns 26 single as shown in FIGURE 2. The inclusion in the ply 10 of the spaced-apart thicker yarns 26 produces high points 22 throughout the surface of the ply. The valleys between these high points 22 form the intercommunicating air channels or cells 20.

Instead of using weft threads and warp threads of different thickness as shown in FIGURES 1 and 2, all the threads in the ply 10 may be of the same thickness so as to produce a 3 and 1 hopsack for example. When the ply 12 is bonded to a ply so woven, the channels 20 will, in the case where the second ply 12 is bonded to the weft face, run weftwise. Similarly, in the case where the second ply 12 is bonded to the warp face of the first ply 10, the channels 20 will run warp-wise. This is of appreciable advantage when the fabric is used in clothing, as the fabric can then be cut so that the channels extend in the direction of the "lines of bend" which the fabric has to take at, say, the elbow joint and knee portions of the garment.

As already indicated, the first ply 10 is loosely woven or loosely set and is constructed of high bulk yarns having a low twist. A typical low twist yarn is one having four turns per inch, and an example of a loosely-woven or loosely-set cloth is a fifteen ounce woollen cloth having sixteen warp and sixteen weft threads per inch.

The term "low twist" means that the yarn is given a minimum number of turns in order to leave a large number of free fibres. This is to trap the maximum amount of air between the plies 10 and 12 and also to provide raised fibres 14 by which the second ply 12 is attached to the first ply 10.

A loosely woven fabric means one that is underset. Each cloth has a setting which is calculated by a fixed formula to give the required number of ends per inch (or threads per inch) for a given count or run of yarn. Thus, a cloth which is underset is woven with less threads per inch than the set minimum.

The formula used to calculate the cloth setting in the woollen and worsted trade is normally:

$$T = KC \times FM$$

where $T$ = number of threads per inch;
$K$ = a constant which varies according to the kind of yarn and system of numbering;
$C$ = the average counts of yarn;
$F$ = the average float; and
$M$ = a constant which varies according to the type of weave.

The numerical value of K for various yarns is as follows:

| | |
|---|---|
| Worsted yarns | 134 |
| Cotton | 200 |
| Yorks skein | 60 |
| Twill weaves | 0.39 |
| Satin | 0.42 |
| Plain weave | 0.34 |
| Hopsack | 0.34 |

This formula is used for hard-wearing, close-set cloth, so that as the cloth desired for the ply 10 is a loosely-woven cloth which is "underset," there is a reduction of between 30% and 10% both warp and weft to achieve the desired result.

Adhesive is first applied to the raised fibres 14 and then to the second ply 12, after which the two plies 10 and 12 are joined together.

Adhesive is applied to the raised fibres 14 of the first ply 10 by the machine shown diagrammatically in FIG. 3. This machine comprises a power-driven take-up roller 30, a let-off roller 32 and a rubber-faced roller 34 above the let-off roller. The rollers 32 and 34 may or may not be driven, but in those cases where they are driven the relative rates of relation of the three rollers is adjusted as the diameter of the cloth on the let-off roller 32 decreases and the diameter of the cloth on the take-up roller increases. A return roller 36 is used so that the rollers 32 and 34 can be arranged adjacent each other.

Arranged immediately above the roller 34 is a doctor blade 38 having its edge set a fraction of an inch above the upper surface of the ply 10, a typical clearance being one thousandth of an inch. Adhesive 40 is applied to one side of the blade 38 so that, as the cloth travels beneath the blade, it tends to drag some of the adhesive with it. The narrow clearance between the blade and the cloth results however in only a thin film of adhesive of about one-thousandth of an inch thickness being applied to the cloth. Further, as the adhesive is viscous as distinct from being free-flowing, the film of adhesive attaches itself to the raised fibres of the cloth but does not enter the spaces between weft and warp and does not strongly adhere directly to the high points 22 of the cloth. The precise viscosity of the adhesive is chosen according to the particular cloth being treated and can be readily determined by trial and error, the governing factors being that the adhesive should be mobile enough to pass beneath the doctor blade in the form of a thin film while at the same time being sufficiently viscous not to flow down the raised fibres to their roots. The best general description of the adhesive is that it is of paste-like consistency and will generally comprise between 45 and 50% solids by weight. A specific adhesive which gives good results in practice has the following basic composition:

| Constituents: | Parts by weight |
|---|---|
| Smoked sheet grade of natural rubber | 100 |
| Stearic acid | 0.5 |
| Zinc oxide | 3.0 |
| Agerite white | 1.0 |
| China clay | 25 |
| Precipitated whiting | 15 |
| Sulphur | 1.5 |
| Butyl Eight [1] accelerator | 4 |

[1] "Butyl Eight" is the trade name used for an accelerator of modified dithiocarbonate, but other room-temperature curing accelerators can be used instead if so desired.

The constituents listed above are carried in a hydrocarbon solvent such as naphtha or toluene, the solid content of the paste-like adhesive formed being between 45 and 50% by weight. The Butyl Eight accelerator should be added immediately prior to use of the adhesive as the adhesive cannot be stored long once the accelerator has been added.

The amount of adhesive applied to the ply 10 will generally be about 5 ounces per square yard, the application of adhesive being carried out at normal room temperatures of about 18° C.

Apart from the viscosity of the adhesive, a further reason why the adhesive attaches itself to the raised fibres 14 and does not penetrate down to their root portions is that the raised fibres are so numerous that they constitute a barrier to the flow of adhesive towards their roots. Thus, in one particular woven fabric in accordance with the invention there are about 10,000 raised fibres per square inch of cloth. This means that, even if the raised fibres bend somewhat as they pass beneath the doctor blade 38, the adhesive is still applied to their tips or, at the least, to the portions above their roots. It also follows from this that the adhesive on the ply 10 is able to form a continuous layer over the entire surface of the ply as the tips of the raised fibres 14 are so numerous.

The bond between the two plies 10 and 12 is therefore a strong one, notwithstanding the fact that the high points 22 on the ply 10 do not actually touch the opposed surface of the ply 12.

After the adhesive has been applied to the ply 10, the adhesive-coated cloth is passed over a steam-chest or hot plate 42 heated to about 100 to 105° C. so as to evaporate the solvent of the adhesive. This dries the adhesive to an extent such that the cloth can be wound on the take-up roller 30 without successive turns of the cloth on the roller sticking to each other.

The second ply 12 has adhesive applied to it on the same form of machine as that used to apply adhesive to the ply 10. In this case the viscosity of the adhesive is as high as possible while still allowing a thin film of the adhesive to pass beneath the edge of the doctor blade. The adhesive applied to the ply 10 must be compatible with the adhesive applied to the ply 12, and one such adhesive which meets this requirement has the following composition:

| Constituents: | Parts by weight |
|---|---|
| Crepe rubber | 100 |
| Sulphur | 1.5 |
| Accelerator | 4 |
| Solvent | 230 |

As in the case of the adhesive applied to the ply 10, the adhesive on the ply 12 is applied at a room temperature of about 18° C. and is then dried by being passed over the steam-chest or hot plate 42 heated to about 100 to 105° C. The amount of adhesive applied to the ply 12 will generally be about 2 ounces per square yard. Due to the high viscosity of the adhesive and the particular weave of the cloth, the adhesive does not penetrate to any substantial extent into the interstices of the cloth.

The two plies 10 and 12, each with its adhesive coating, are then passed through a so-called doubling machine as shown in FIGURE 4. This machine consists essentially of two rollers 44 and 46 between the nip of which the two plies 10 and 12 are passed, the adhesive film on each ply being pressed at the nip into contact with the adhesive film on the other ply. The plies are united in this manner before the adhesive on either or both has fully set, the adhesives used having the characteristic that they can be united as the two layers of adhesive are pressed together, even although the adhesive is already dry enough not to cause sticking of the cloth on the two feed rollers 48 and 50. The composite fabric formed by the uniting of the two plies 10 and 12 is then wound on a driven take-up roller 52.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. A multi-ply fabric comprising a first ply having a multiplicity of fibres projecting substantially uniformly from all parts of one surface, and a second ply connected uniformly over one entire surface to said first ply by adhesive adherence to the ends of the projecting fibres so that the plies may move somewnat in their planes with respect to each other.

2. A composite fabric comprising a first ply of woven wool-based yarn of low twist having a multiplicity of raised fibres, a second ply of woven fabric, a thin uniform coating of adhesive on a surface of the second ply, and a compatible adhesive on the tips only of said raised fibres and extending over the entire surface of said first ply in the form of a uniform film, said adhesive coating and said first ply being bonded together through the compatible adhesive to produce intercommunicating air cells between the plies.

3. A composite fabric comprising a first ply of loosely-set woven yarn of low twist having a multiplicity of raised fibres thickly distributed over its entire surface, a second ply of woven fabric, a thin uniform coating of adhesive on that surface of said second ply which faces said first ply, and a thin uniform film of compatible adhesive carried on the raised fibres of said first ply in such manner that the tips but not the roots of said fibres are embedded in said adhesive film, said adhesive coating on said second ply and said adhesive film on the raised fibres of said first ply being directly attached to each other to produce intercommunicating air cells between the plies.

4. A composite fabric comprising a first ply of woven yarn, said woven yarn being of loose set and of low twist whereby the surface of said ply has shallow hills and valleys, a second ply of woven fabric, a thin uniform coating of adhesive on that surface of said second ply which faces said first ply, a multiplicity of raised fibres thickly distributed over the entire surface of said first ply, a thin uniform film of adhesive compatible with said adhesive coating carried on said raised fibres with at least the tips but not the roots of said fibres embedded in said adhesive film, said adhesive coating on said second ply and said adhesive film on the raised fibres of said first ply being directly attached to each other whereby said valleys in said first ply form air-cells communicating with each other between said hills in said first ply and said adhesive film on said raised fibres.

5. A composite fabric as claimed in claim 4 wherein said woven yarn of said first ply is wool.

6. A composite fabric as claimed in claim 4 wherein said woven yarn of said first ply is only partly wool.

7. A composite fabric as claimed in claim 4 wherein said second ply is waterproof.

8. A composite fabric as claimed in claim 4 wherein said adhesive coating on said second ply comprises rubber with a small proportion of sulphur and an accelerator.

9. A composite fabric as claimed in claim 4 wherein said first ply has at least 10,000 raised fibres per square inch of surface.

10. A composite fabric as claimed in claim 4 wherein said adhesive film on the raised fibres of said first ply has a thickness in the region of one thousandth of an inch.

11. A composite fabric as claimed in claim 3 wherein said adhesive film on the raised fibres of said first ply comprises rubber as its main constituent, the other constituents including china clay, precipitated whiting and an accelerator.

12. A composite fabric as claimed in claim 3 wherein said first ply has a preponderance of warp yarns on one face.

13. A method of producing a composite fabric of two plies, which comprises applying an adhesive to at least the tips but not the roots of a multiplicity of raised fibres projecting from a loosely-set first ply, applying an adhesive coating uniformly to a surface of a second ply, and bonding the adhesive coating to said first ply by pressing said coating against said adhesive.

14. In a method of producing a multi-ply fabric, the steps of applying adhesive having a paste-like consistency to the outer ends but not the roots of fibres projecting from one of said plies, and adhesively bonding the coated ends of said fibres to a second ply.

No references cited.

ALEXANDER WYMAN, *Primary Examiner.*

R. H. CRISS, *Assistant Examiner.*